(12) United States Patent
Lee

(10) Patent No.: US 11,807,776 B2
(45) Date of Patent: Nov. 7, 2023

(54) MODIFIED SILOXANE RESIN, MODIFIED SILOXANE RESIN CROSSLINKED PRODUCT, AND MANUFACTURING METHOD FOR RESIN CROSSLINKED PRODUCT

(71) Applicant: Kyungpook National University Industry-Academic Cooperation Foundation, Daegu (KR)

(72) Inventor: Dong Yun Lee, Suwon-si (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 38 days.

(21) Appl. No.: 17/588,801

(22) Filed: Jan. 31, 2022

(65) Prior Publication Data

US 2022/0154000 A1  May 19, 2022

Related U.S. Application Data

(63) Continuation-in-part of application No. 16/955,350, filed as application No. PCT/KR2018/013053 on Oct. 30, 2018, now abandoned.

(30) Foreign Application Priority Data

Dec. 19, 2017 (KR) .......................... 10-2017-0174956

(51) Int. Cl.
| | | |
|---|---|---|
| C09D 183/14 | (2006.01) |
| C08G 77/388 | (2006.01) |
| C08L 83/04 | (2006.01) |
| C08G 77/18 | (2006.01) |
| C08J 3/24 | (2006.01) |
| C08G 77/24 | (2006.01) |
| C08G 77/54 | (2006.01) |

(52) U.S. Cl.
CPC ........... C09D 183/14 (2013.01); C08G 77/18 (2013.01); C08G 77/24 (2013.01); C08G 77/388 (2013.01); C08J 3/24 (2013.01); C08L 83/04 (2013.01); C08G 77/54 (2013.01); C08L 2312/00 (2013.01)

(58) Field of Classification Search
CPC ........ C08G 77/14; C08G 77/16; C08G 77/18; C08K 5/544; C09D 183/06
See application file for complete search history.

(56) References Cited

U.S. PATENT DOCUMENTS

| 5,074,912 A | 12/1991 | Liles et al. |
|---|---|---|
| 6,558,804 B2 * | 5/2003 | Sato ..................... C09D 183/08 |
| | | 106/287.19 |
| 2006/0153993 A1 | 7/2006 | Schmidt et al. |
| 2009/0080933 A1 | 3/2009 | Kuruma et al. |
| 2009/0256287 A1 | 10/2009 | Fu et al. |
| 2013/0004137 A1 | 1/2013 | Jin et al. |
| 2013/0295330 A1 | 11/2013 | Kodama et al. |
| 2016/0236467 A1 | 8/2016 | Takahashi et al. |
| 2018/0112082 A1 | 4/2018 | Hamade |
| 2019/0023848 A1 | 1/2019 | Mizuta et al. |
| 2019/0100006 A1 | 4/2019 | Ishii |
| 2020/0385531 A1 | 12/2020 | Rathore et al. |

FOREIGN PATENT DOCUMENTS

| JP | 10-110101 A | 4/1998 |
|---|---|---|
| JP | 2005-015581 A | 1/2005 |
| KR | 10-0142148 B1 | 6/1998 |
| KR | 10-0837587 B1 | 6/2008 |
| KR | 10-2014-0004568 A | 1/2014 |

OTHER PUBLICATIONS

International Search Report dated Feb. 15, 2019 in corresponding International Patent Application No. PCT/KR2018/013053 (2 pages in English, 2 pages in Korean).
Written Opinion of the International Searching Authority dated Feb. 15, 2019 in corresponding International Patent Application No. PCT/KR2018/013053 (7 pages in Korean).
Korean Office Action dated Dec. 11, 2018 in corresponding Korean Patent Application No. 10-2017-0174956 (6 pages in Korean).
Pathak et al., "Synthesis and performance evaluation of environmentally compliant epoxysilane coatings for aluminum alloy," Progress in Organic Coatings, 2008, vol. 62, pp. 409-416.
Vreugdenhil et al., "Triggered release of molecular additives from epoxy-amine sol-gel coatings," Progress in Organic Coatings, 2005, vol. 53. pp. 119-125.
Kim, "Fabrication of Robust Superhydrophobic Surfaces with Modified Siloxane Resin and Controlled Dispersion of Nanoparticles," Master's Thesis, The Graduate School of Kyungpook National University, School of Applied Chemical Engineering, Department of Polymer Science and Engineering, Feb. 2018, 58 pages.

* cited by examiner

Primary Examiner — Marc S Zimmer
(74) Attorney, Agent, or Firm — NSIP Law

(57) ABSTRACT

The present invention relates to a modified siloxane resin, a crosslinked modified siloxane resin, and a method for preparing the crosslinked resin. More specifically, the present invention relates to a modified siloxane resin, a crosslinked modified siloxane resin with excellent superhydrophobicity obtained by dual curing of the resin, and a method for preparing the crosslinked resin. The use of the modified siloxane resin according to the present invention allows the crosslinked modified siloxane resin to have excellent superhydrophobicity and high hardness. The water repellency of the crosslinked resin can be appropriately controlled by varying the amount of the siloxane resin mixed.

6 Claims, 10 Drawing Sheets

[Fig. 1]
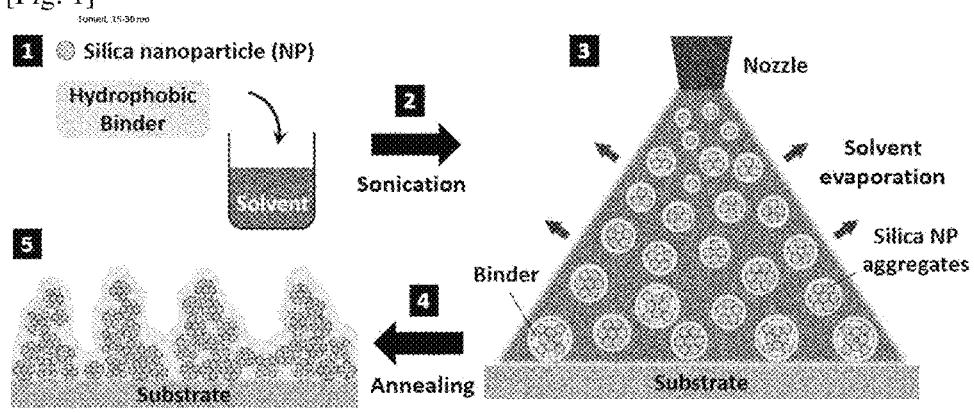
[Fig. 2]
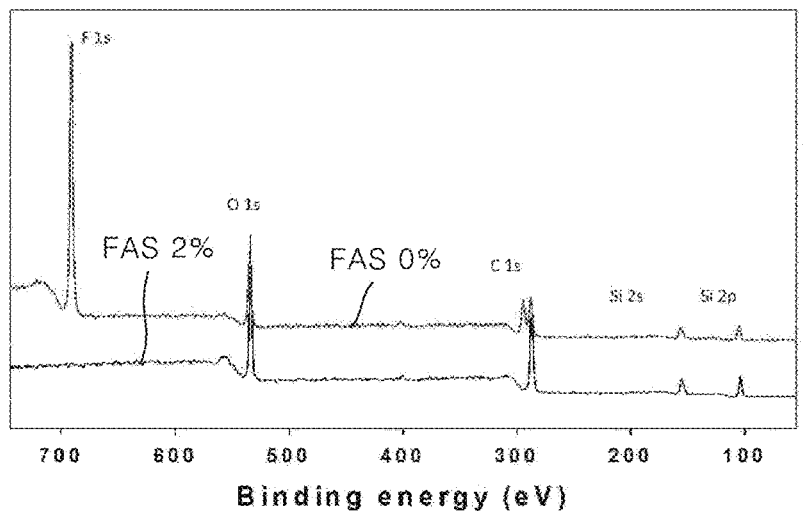

[Fig. 3]
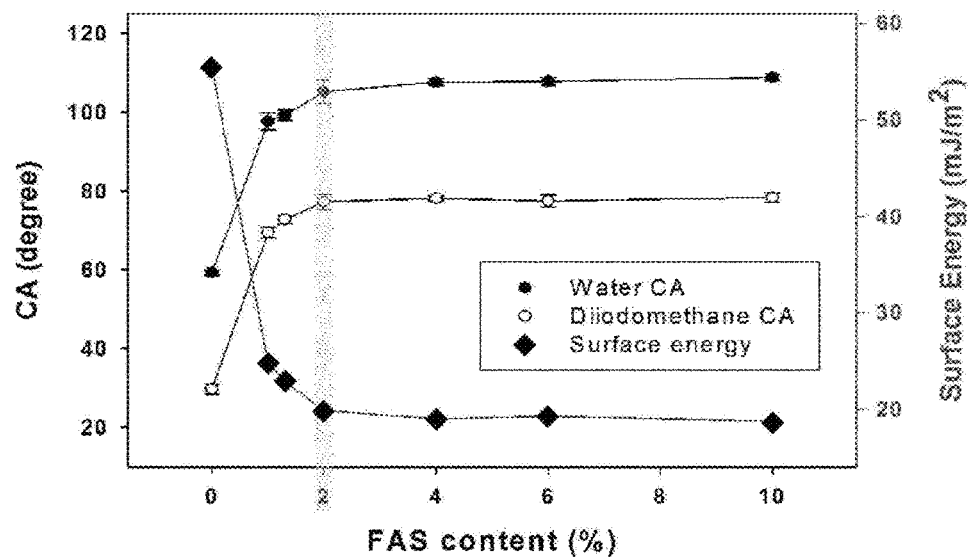
[Fig. 4]
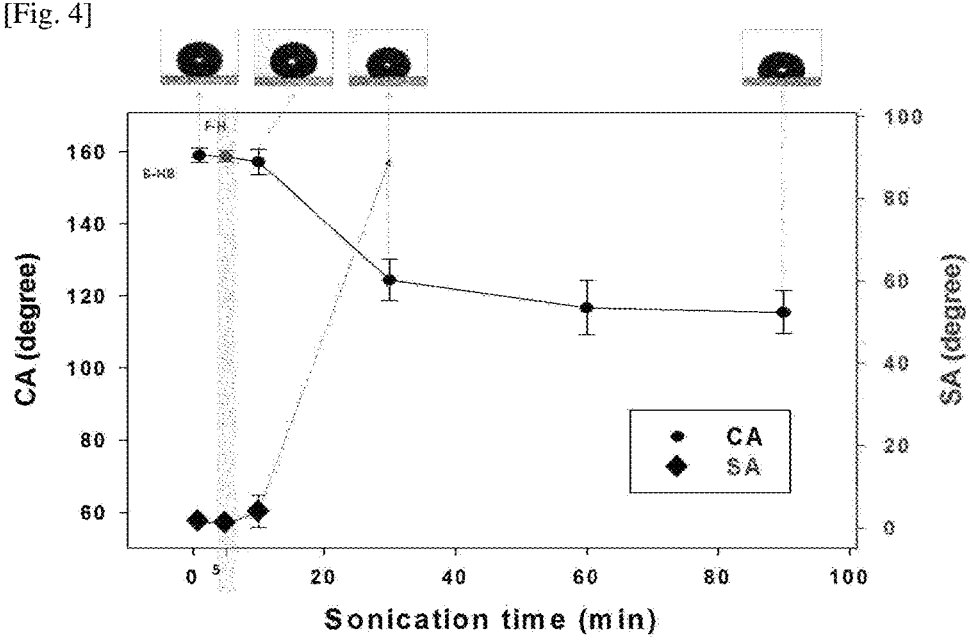

[Fig. 5]
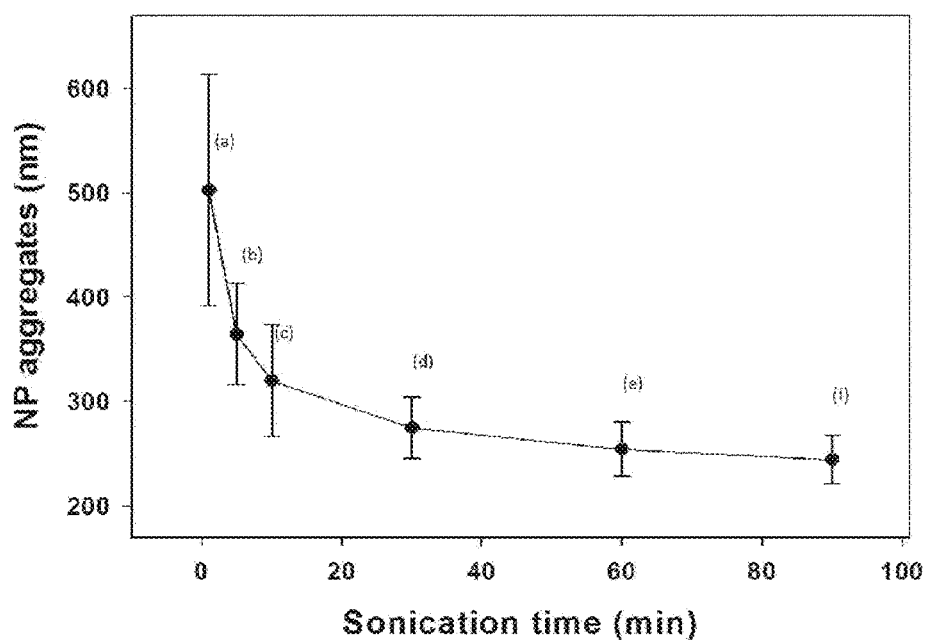

[Fig. 6]
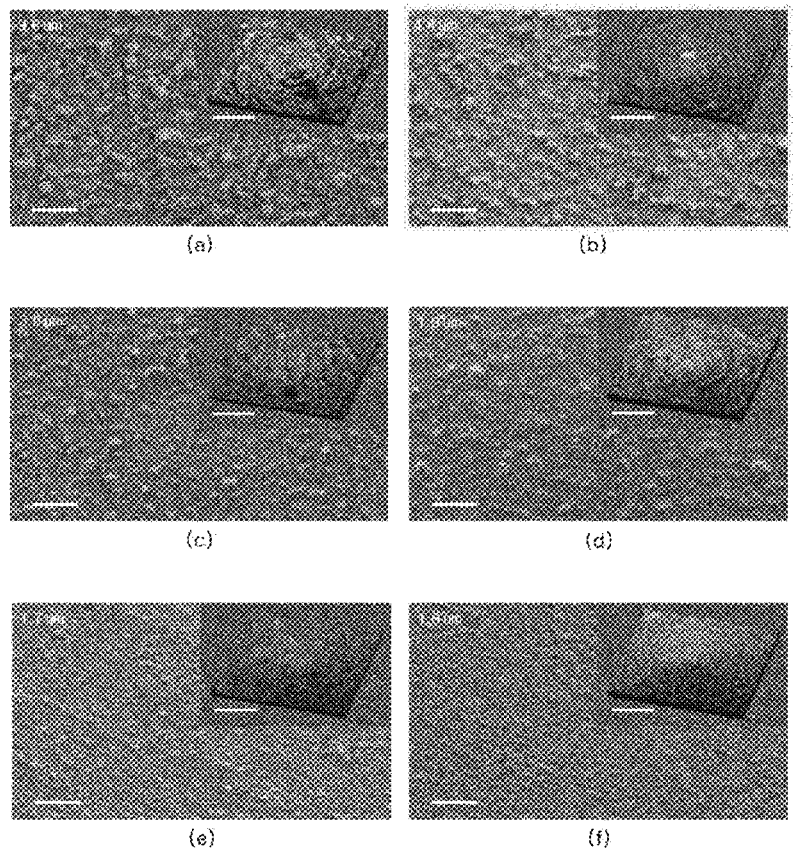
* Scale bar represents 100 μm

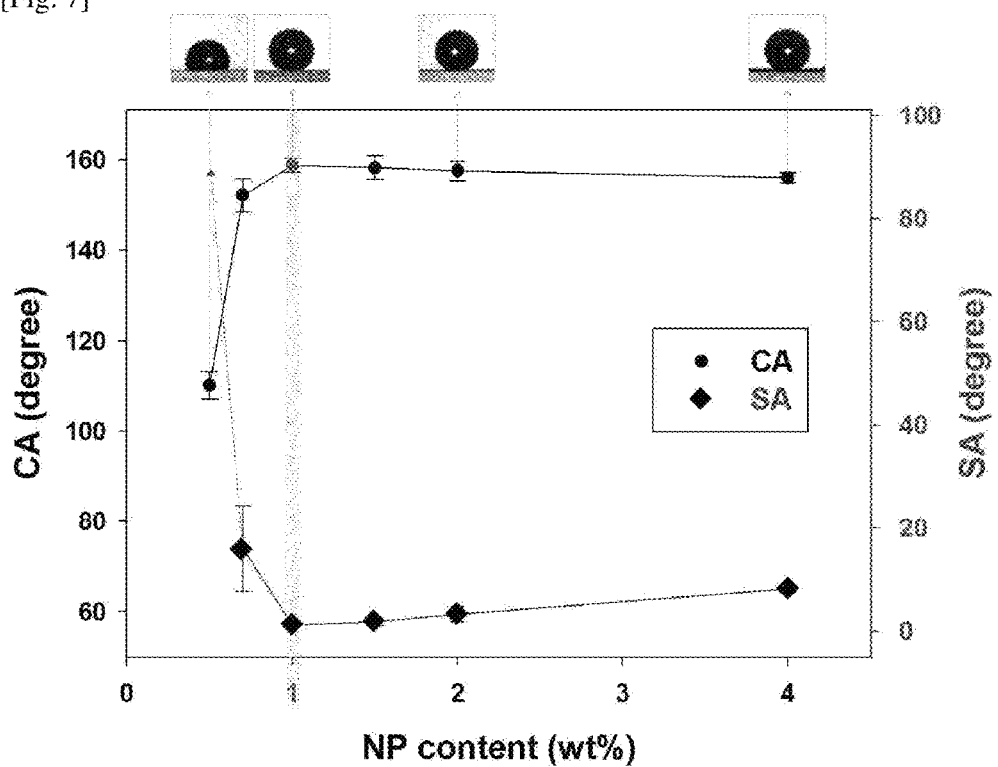
[Fig. 7]

[Fig. 8]
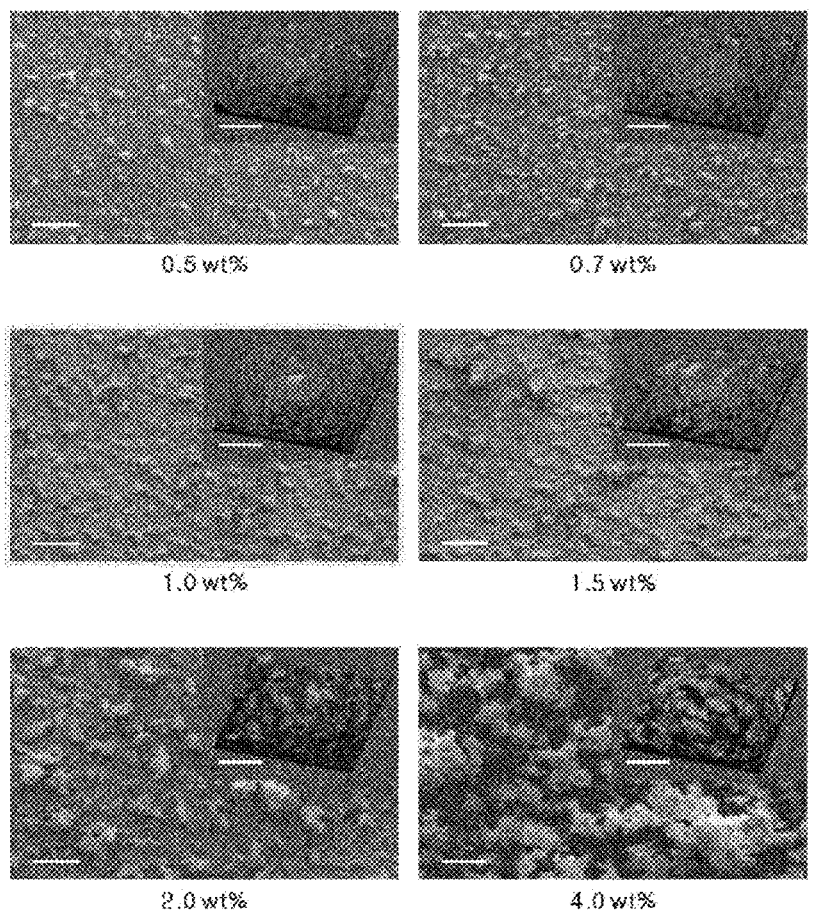

[Fig. 9]
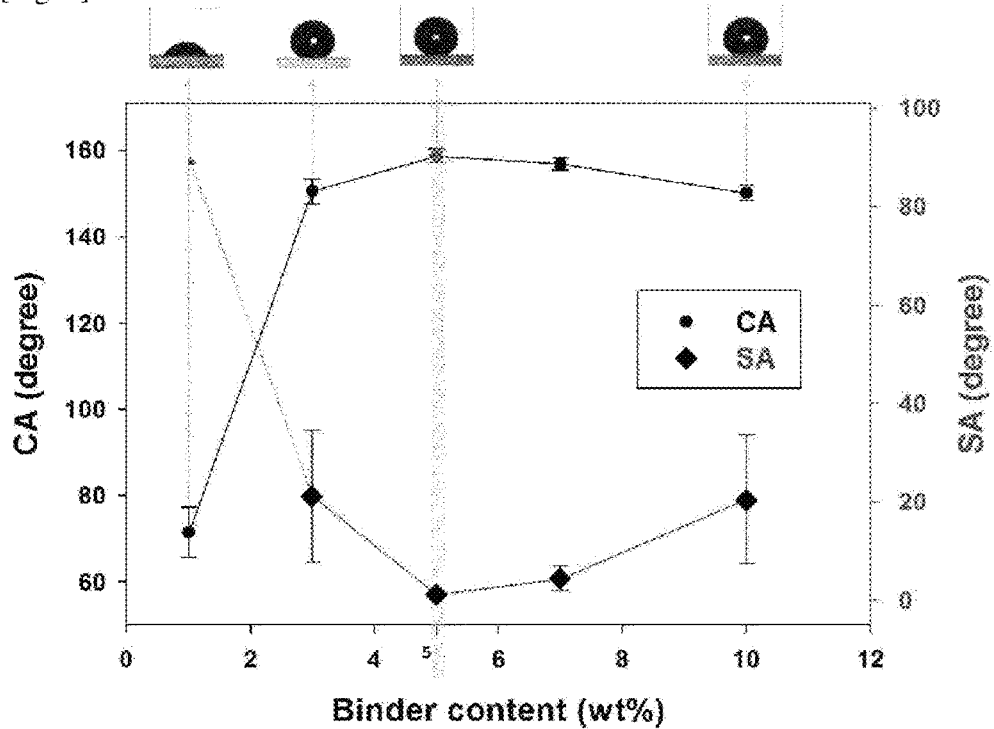
[Fig. 10]
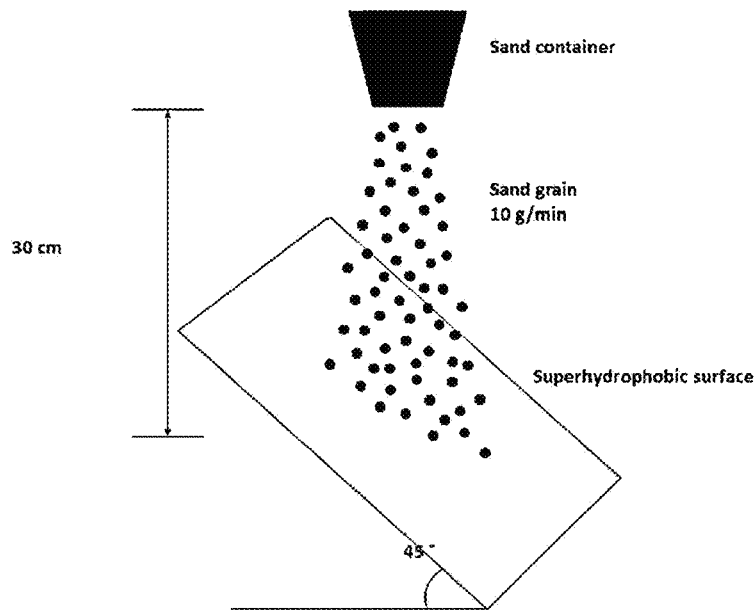

[Fig. 11]
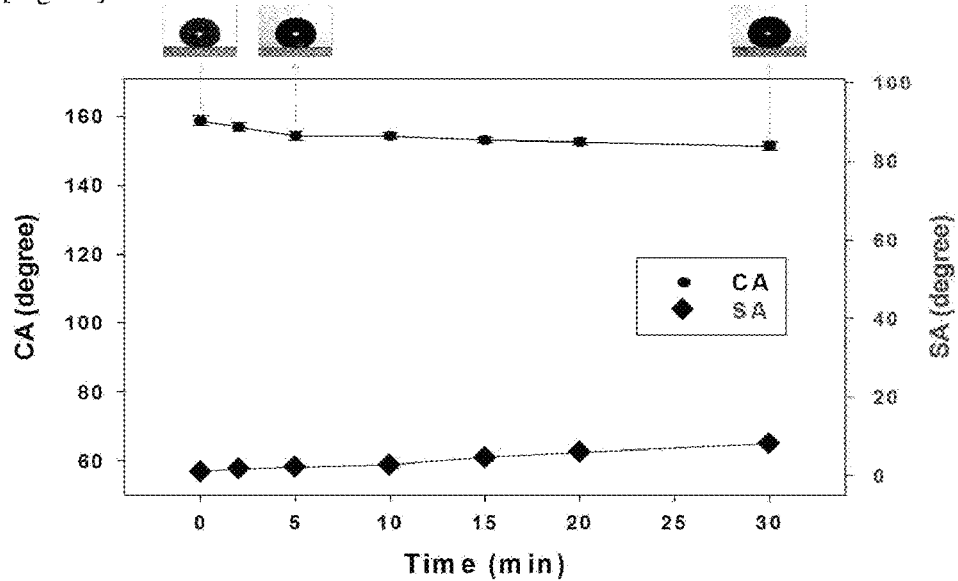
[Fig. 12]
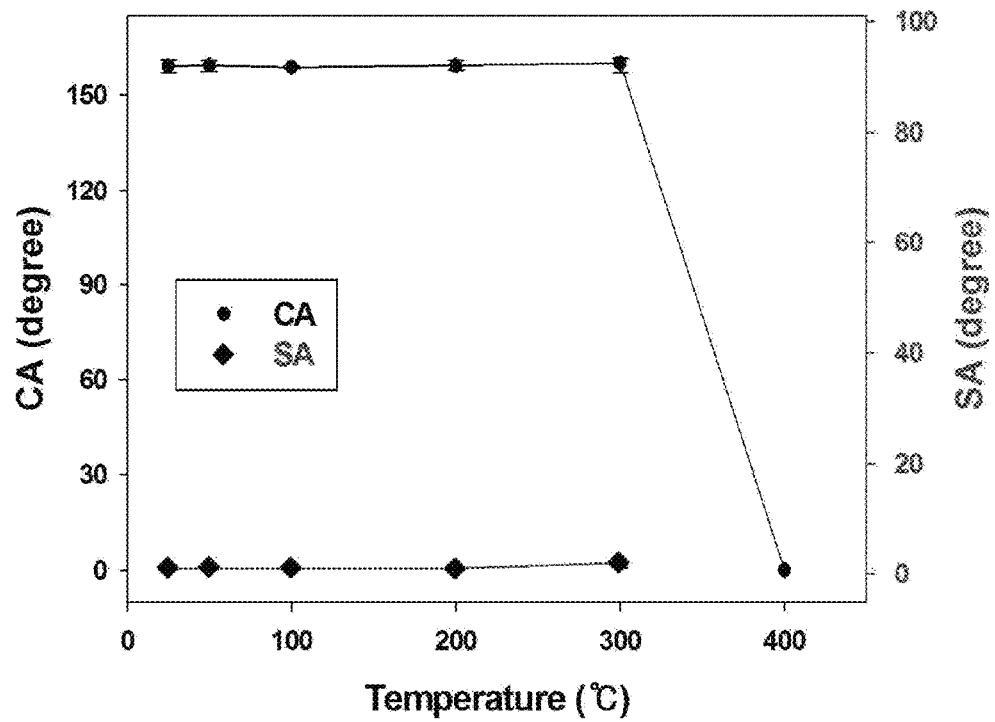

[Fig. 13]
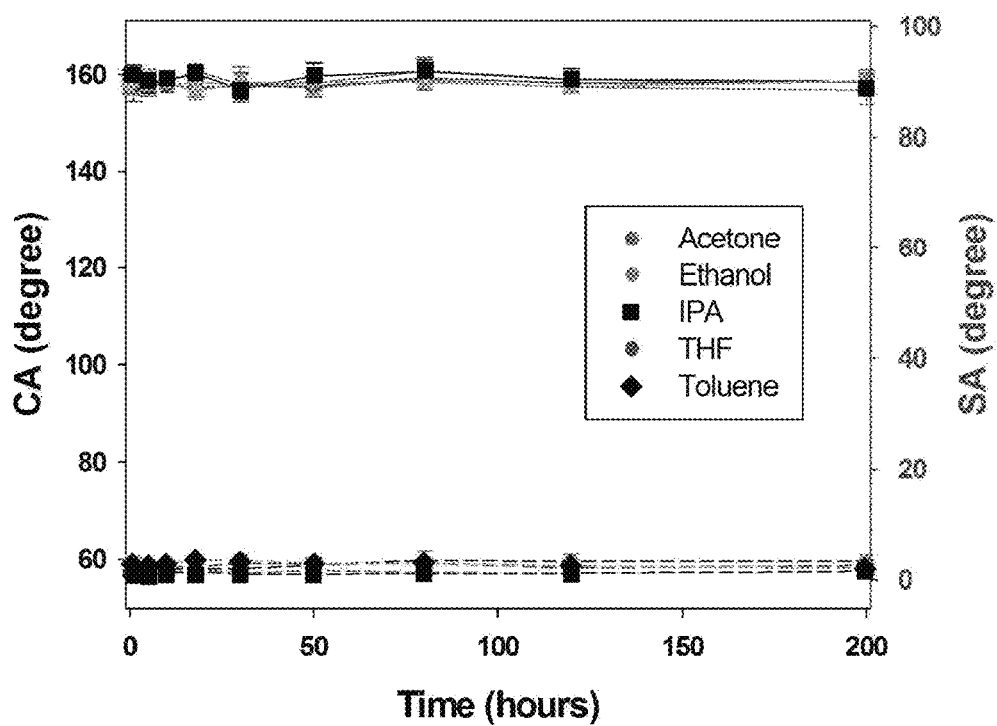

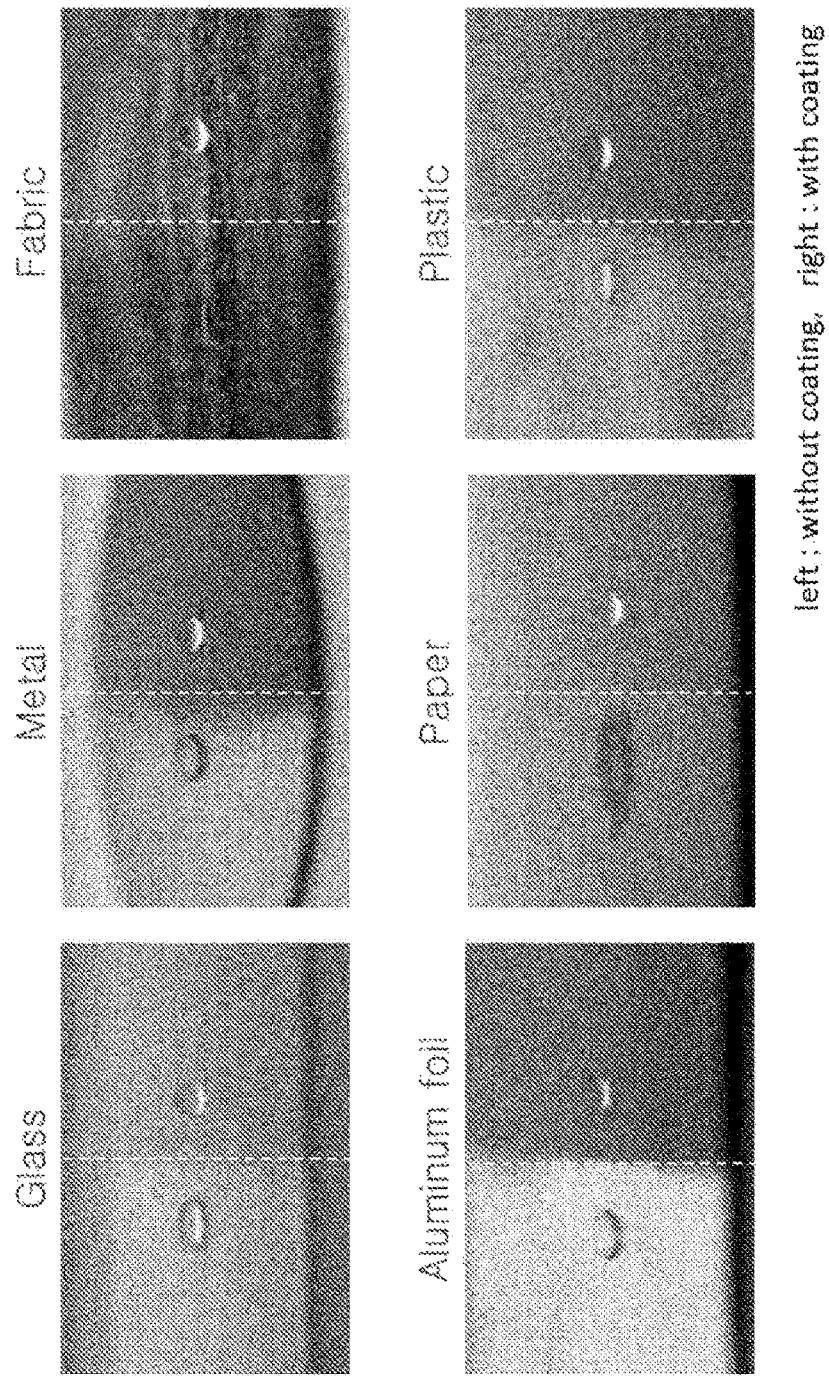
[Fig. 14]

MODIFIED SILOXANE RESIN, MODIFIED SILOXANE RESIN CROSSLINKED PRODUCT, AND MANUFACTURING METHOD FOR RESIN CROSSLINKED PRODUCT

CROSS-REFERENCE TO RELATED APPLICATIONS

This application is a continuation in part of U.S. patent application Ser. No. 16/955,350 filed on Jun. 18, 2020, which is a U.S. National Stage Application of International Application No. PCT/KR2018/013053, filed on Oct. 30, 2018, which claims the benefit under 35 USC 119(a) and 365(b) of Korean Patent Application No. 10-2017-0174956, filed on Dec. 19, 2017 in the Korean Intellectual Property Office, the entire disclosure of which is incorporated herein by reference for all purposes.

TECHNICAL FIELD

The present invention relates to a modified siloxane resin, a crosslinked modified siloxane resin, and a method for preparing the crosslinked resin. More specifically, the present invention relates to a modified siloxane resin, a crosslinked modified siloxane resin with excellent superhydrophobicity obtained by dual curing of the resin, and a method for preparing the crosslinked resin.

BACKGROUND ART

The desired water repellency properties are usually obtained by applying a water-repellent composition to the external surface of a substrate so as to create a water repellent coating on the substrate which protects this substrate from weathering and other deterioration. At least the outermost surface of building materials is treated in order to become waterproof.

Silicone compounds are used as water repellents due to their durability, good hydrophobicity and ease of application. First, silicone resins in solvent and methylsiliconates were used as silicone water repellent compounds. Then followed siloxane and silane based products in solvents. Next generation of water repellents is generally water based for environmental reasons and ease of use. The active ingredients contain siloxanes, silicone resins and silanes (and combinations of them).

Silane-based compounds having one or more hydrolyzable groups in the molecule are used to improve water repellency. For example, an alkoxysilane undergoes a chemical conversion to a siloxane to achieve water repellency. However, the conversion to the siloxane requires controlled temperature and water content within respective predetermined ranges. The use of an alkali is also required for this conversion. If any one of these conditions is not met, the alkoxysilane is volatilized before curing, causing poor water repellency and penetration resistance.

Korean Patent No. 10-142148 discloses a method for preparing a water-soluble water repellent containing 1,1,1-trimethoxy-3-aryl-silabutane, methyltrimethoxysilane, and N-(2-aminoethyl)-3-aminopropyltrimethoxysilane. However, the water repellent prepared by this method is insufficient in water repellency and penetration resistance, and the silane compounds are difficult to obtain commercially.

U.S. Pat. No. 5,074,912 discloses a water repellent composition for treating porous substrates with an emulsion containing a siloxane which is a linear methylhydrogen-methylalkyl siloxane copolymer or a methylhydrogen-methylalkyl cyclosiloxane copolymer. However, this product presents a Volatile Organic Content (VOC) of more than 100 g/l whereas emulsions having less than 100 g/l or even less than 50 g/l are desired.

Korean Patent No. 10-0837587 discloses a fluorinated organic compound/silicone mixed composition which imparts oil repellency and/or water repellency to fiber materials. The composition is crosslinked to provide a hydrophobic, lipophobic silicone elastomer coating due to the presence of polyfluoroacrylate groups. The crosslinkable liquid composition can be applied to fiber materials but is complicated to process and has poor water repellency properties. Thus, the present inventor has conducted research to solve the above-mentioned problems and finally arrived at the present invention.

DETAILED DESCRIPTION OF THE INVENTION

Problems to be Solved by the Invention

One object of the present invention is to provide a modified siloxane resin with good water repellency.

A further object of the present invention is to provide a crosslinked modified siloxane resin.

Another object of the present invention is to provide a method for preparing the crosslinked modified siloxane resin.

Means for Solving the Problems

One aspect of the present invention provides a modified siloxane resin represented by Formula 1:

$$[R_1Si(OCH_3)_x(OH)_yO_z]_m[R_2Si(R_3)_{x'}(OH)_{y'}O_{z'}]_n \qquad \text{[Formula 1]}$$

wherein each $R_1$ is a substituent including an epoxy group, each $R_2$ is a substituent including an alkyl, phenyl or fluoroalkyl group, each $R_3$ is an alkoxy or a substituent including chlorine, each x, y, x', y' is an integer of 0 or 1, and z is 3−x−y, z' is 3−x'−y', and each m, n is an integer from 1 to 100, preferably 1 to 30.

A further aspect of the present invention provides a crosslinked modified siloxane resin represented by Formula 2:

[Formula 2]

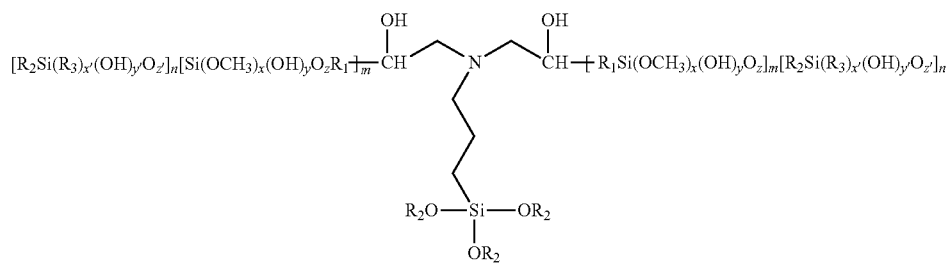

wherein each $R_1$ is a substituent including an epoxy group, each $R_2$ is a substituent including an alkyl, phenyl or fluoroalkyl group, each $R_3$ is an alkoxy or a substituent including chlorine, each x, y, x', y' is an integer from 0 or 1, z is 3−x−y, z' is 3−x'−y', and each m, n is an integer from 1 to 100, preferably 1 to 30.

Another aspect of the present invention provides a method for preparing a crosslinked modified siloxane resin, including (a) mixing and reacting a (3-glycidyloxypropyl) trimethoxysilane with a compound including one or more alkoxysilane groups to prepare the modified siloxane resin, (b) adding a compound having an aminosilane group to the modified siloxane resin to prepare a modified siloxane resin composition wherein the compound having an aminosilane group is added in an amount of 0.1 to 10 mol % with respect to the trimethoxysilane compound, and (c) applying the composition to a substrate, followed by annealing.

Effects of the Invention

The use of the modified siloxane resin according to the present invention allows the crosslinked modified siloxane resin to have excellent superhydrophobicity and high hardness. The water repellency of the crosslinked resin can be appropriately controlled by varying the amount of the siloxane resin mixed.

BRIEF DESCRIPTION OF THE DRAWINGS

FIG. 1 shows a procedure for spray coating on a substrate in accordance with one exemplary embodiment of the present invention.

FIG. 2 shows an XPS spectrum of a siloxane resin according to one exemplary embodiment of the present invention.

FIG. 3 shows the surface energies of siloxane resins according to exemplary embodiments of the present invention.

FIG. 4 shows the wet properties of a siloxane resin according to one exemplary embodiment of the present invention as a function of sonication time.

FIG. 5 shows the sizes of aggregates in a resin according to one exemplary embodiment of the present invention as a function of sonication time.

FIG. 6 shows the surface roughnesses of resins according to exemplary embodiments of the present invention when sonicated for different times.

FIGS. 7 and 8 show the water repellency properties of resins according to exemplary embodiments of the present invention with varying concentrations of particles in solution.

FIG. 9 shows the water repellency properties of resins according to exemplary embodiments of the present invention with varying binder contents.

FIG. 10 shows a method for measuring the water repellency properties of a coating formed in accordance with one exemplary embodiment of the present invention.

FIG. 11 shows the hardness values of a superhydrophobic surface fabricated by the application of a siloxane resin according to one exemplary embodiment of the present invention.

FIG. 12 shows the thermal stability of a water repellent coating solution prepared in accordance with one exemplary embodiment of the present invention after coating.

FIG. 13 shows the chemical resistance of water repellent coating solutions prepared in accordance with exemplary embodiments of the present invention to organic solvents.

FIG. 14 shows photographs of water repellent materials according to exemplary embodiments of the present invention after coating on various substrates.

MODE FOR CARRYING OUT THE INVENTION

The present invention will now be described in detail.
The present invention provides a modified siloxane resin represented by Formula 1:

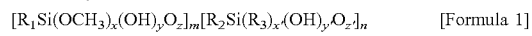

[Formula 1]

wherein each $R_1$ is a substituent including an epoxy group, each $R_2$ is a substituent including an alkyl, phenyl or fluoroalkyl group, each $R_3$ is an alkoxy or a substituent including chlorine, each x, y, x', y' is an integer of 0 or 1, z is 3−x−y, z' is 3−x'−y', and each m, n is an integer from 1 to 100, preferably 1 to 30.

In Formula 1, $R_1$ is a 3-glycidyloxypropyl group, $R_2$ is preferably a methyl, n-decyl, phenyl or heptadecafluoro-1,1,2,2-tetrahydrodecyl group, more preferably a heptadecafluoro-1,1,2,2-tetrahydrodecyl group, and $R_3$ is an ethoxy group.

The weight average molecular weight of the resin is preferably from 2,000 to 5,000.

According to a further embodiment of the present invention, there is provided a crosslinked modified siloxane resin represented by Formula 2:

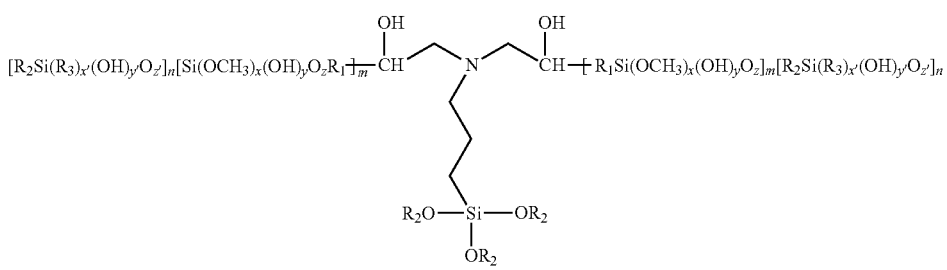

[Formula 2]

wherein each $R_1$ is a substituent including an epoxy group, each $R_2$ is a substituent including an alkyl, phenyl or fluoroalkyl group, each $R_3$ is an alkoxy or a substituent including chlorine, each x, y, x', y' is an integer of 0 or 1, z is 3−x−y, z' is 3−x'−y', and each m, n is an integer from 1 to 100, preferably 1 to 30.

wherein $R_1$ is a substituent including an epoxy group, preferably a 3-glycidyloxypropyl group, each $R_2$ is a substituent group including alkyl, phenyl or fluoroalkyl group, preferably a methyl, n-decyl, phenyl or heptadecafluoro-1,1,2,2-tetrahydrodecyl group, more preferably heptadecafluoro-1,1,2,2-tetrahydrodecyl, each $R_3$ is a methoxy, ethoxy or a substituent including chlorine, preferably an ethoxy group, each x, y is an integer from 0 or 1 and each m, n is an integer from 1 to 100, preferably 1 to 30.

Further embodiment of the present invention provides a modified siloxane resin represented by Formula 3:

[Formula 3]

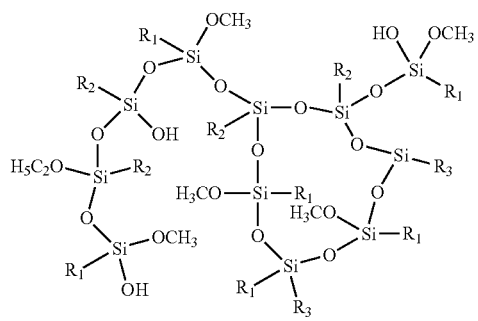

wherein each $R_1$ is a substituent including an epoxy group, each $R_2$ is a substituent including an alkyl, phenyl or fluoroalkyl group, each $R_3$ is an alkoxy or a substituent including chlorine.

In Formula 3, $R_1$ is a 3-glycidyloxypropyl group, $R_2$ is preferably a methyl, n-decyl, phenyl or heptadecafluoro-1,1,2,2-tetrahydrodecyl group, more preferably a heptadecafluoro-1,1,2,2-tetrahydrodecyl group, and $R_3$ is an ethoxy group.

Further embodiment of the present invention provides a modified siloxane resin represented by Formula 4:

[Formula 4]

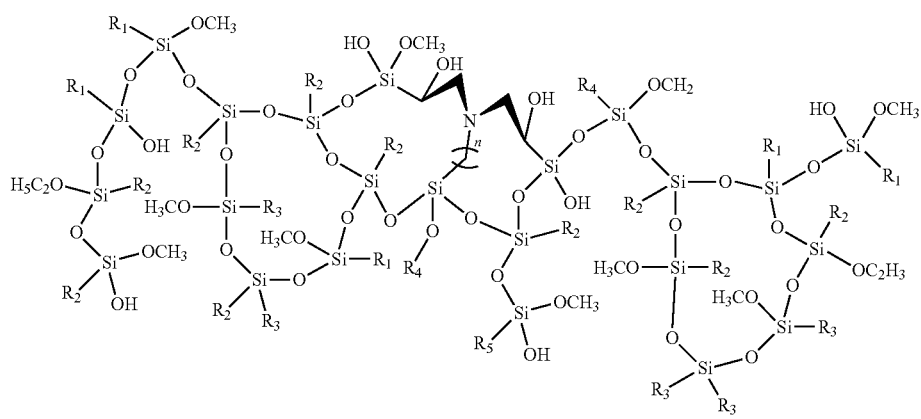

wherein n is an integer from 0 to 10, preferably 0 or 1, more preferably 0, each $R_1$ is a substituent including an epoxy group, preferably a 3-glycidyloxypropyl group, each $R_2$ is a substituent group including alkyl, phenyl or fluoroalkyl group, preferably a methyl, n-decyl, phenyl or heptadecafluoro-1,1,2,2-tetrahydrodecyl group, more preferably heptadecafluoro-1,1,2,2-tetrahydrodecyl, each $R_3$ is an alkoxy or a substituent including chlorine, preferably an ethoxy group, and $R_4$ is a methyl or ethyl group, preferably an ethyl group.

According to another embodiment of the present invention, there is provided a method for preparing a crosslinked modified siloxane resin, including (a) mixing and reacting a (3-glycidyloxypropyl)trimethoxysilane with a compound including one or more alkoxysilane groups to prepare the modified siloxane resin, (b) adding a compound having an aminosilane group to the modified siloxane resin to prepare a modified siloxane resin composition wherein the compound having an aminosilane group is added in an amount of 0.1 to 10 mol % with respect to the trimethoxysilane compound, and (c) applying the composition to a substrate, followed by annealing.

The silane monomer having an epoxy group is preferably (3-glycidyloxypropyl)trimethoxysilane. An organic solvent may be added to control the viscosity of the silane monomer and to facilitate the processability of the silane monomer.

The compound including one or more alkoxysilane groups may be selected from (heptadecafluoro-1,1,2,2-tetrahydrodecyl)triethoxysilane (FAS), (heptadecafluoro-1,1,2,2-tetrahydrodecyl)trichlorosilane (FCS), n-decyltriethoxysilane (DTES), dimethoxydimethylsilane (DMDMS), and dimethoxydiphenylsilane (DMDPS). The compound including one or more alkoxysilane groups is preferably (heptadecafluoro-1,1,2,2-tetrahydrodecyl)triethoxysilane (FAS).

The compound having an aminosilane group is preferably 3-aminopropyltrimethoxysilane (APTMS) or 3-aminopropyltriethoxysilane (APTES).

The modified siloxane resin is prepared through a hydrolysis-condensation reaction of the (3-glycidyloxypropyl)trimethoxysilane compound and the compound including one or more alkoxysilane groups in the presence of water and a catalyst. This reaction is allowed to proceed with stirring at room temperature for about 24 hours. Alcohol and water may be formed as by-products of the reaction. The removal of the by-products can suppress the reverse reaction and drive the forward reaction, enabling control over reaction rate.

According to one embodiment of the present invention, Reagent A may react with Reagent B to prepare a fluorinated siloxane resin, as depicted in Reaction Scheme 1:

[Reaction Scheme 1]

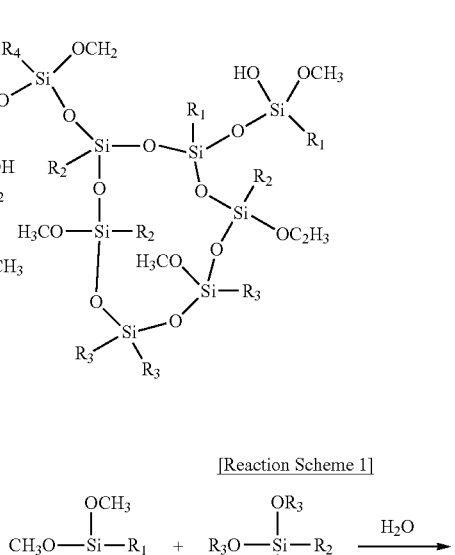

wherein $R_1$ is a substituent including an epoxy group, preferably a 3-glycidyloxypropyl group, each $R_2$ is a substituent group including alkyl, phenyl or fluoroalkyl group, preferably a methyl, n-decyl, phenyl or heptadecafluoro-1,1,2,2-tetrahydrodecyl group, more preferably heptadecafluoro-1,1,2,2-tetrahydrodecyl, each $R_3$ is a methoxy, ethoxy or a substituent including chlorine, preferably an ethoxy group, x, y is an integer of 0 or 1, z is 3−x−y, z' is 3−x'−y', and each m, n is an integer from 1 to 100, preferably 1 to 30.

Referring to Reaction Scheme 1, the reaction of [Reagent A] with [Reagent B] is accomplished by a base-catalyzed hydrolytic condensation. First, the alkoxy groups of [Reagent A] and [Reagent B] are hydrolyzed into OH groups. Alkoxy groups remaining unhydrolyzed (if present) are condensed with the OH groups or the OH groups are condensed with each other to form siloxane bonds. This reaction is carried out at room temperature for 24 hours to prepare a fluorinated siloxane resin.

According to one embodiment of the present invention, the fluorinated siloxane resin is crosslinked with a silane compound including an amino group, as depicted in Reaction Scheme 2:

[Reaction Scheme 3]

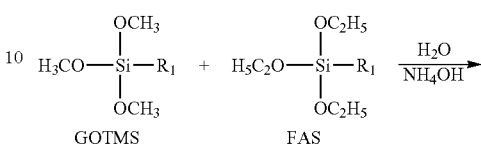

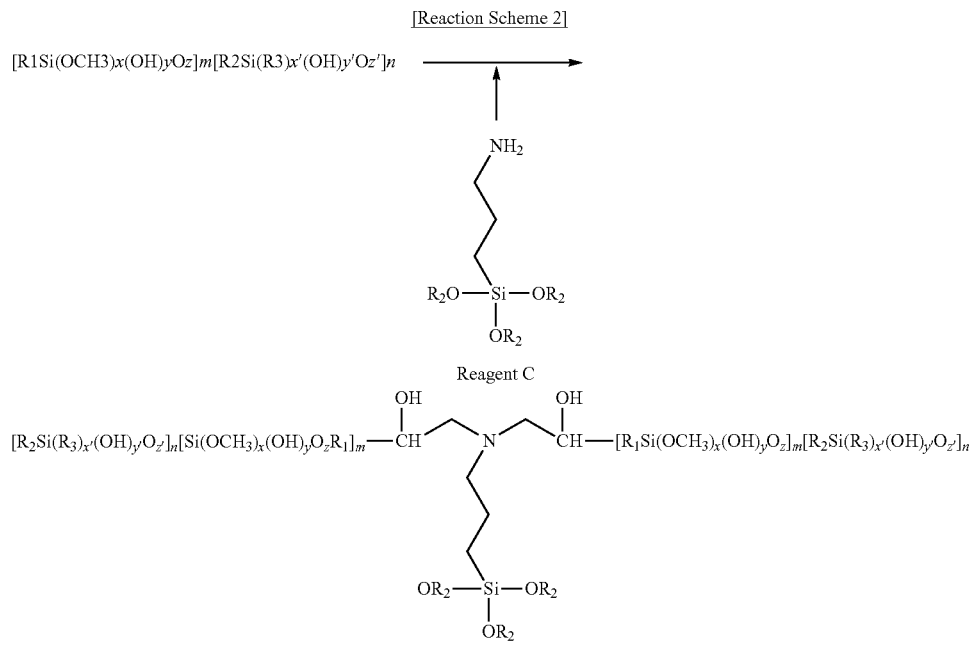

wherein each $R_1$, $R_2$, $R_3$, each x, y, z, x', y', z', m, n, is the same as described above.

Referring to Reaction Scheme 2, the siloxane resin is cured by double-crosslinking with [Reagent C] having an $NH_2$ group.

First, the epoxy groups of the siloxane resin react with the $NH_2$ group of Reagent C. That is, the epoxy rings can be opened by the $NH_2$. As a result of the reaction, the siloxane resin can be connected to the Reagent C. Next, the alkoxy groups or OH groups remaining in the siloxane resin react with the alkoxy groups of the Reagent C. The siloxane resin can be cured by a hydrolytic condensation reaction, which is a general reaction between silanes.

According to one embodiment of the present invention, GOTMS may react with FAS to prepare a fluorinated siloxane resin, as depicted in Reaction Scheme 3:

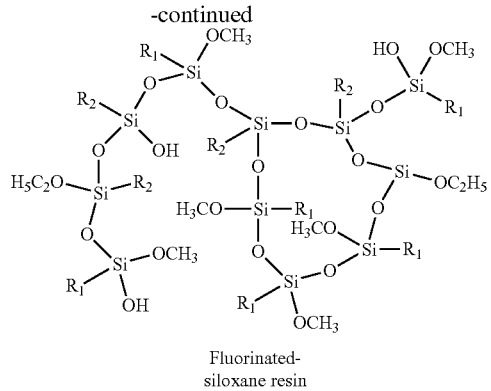

Fluorinated-siloxane resin wherein $R_1$ is a substituent including an epoxy group, preferably a 3-glycidyloxypropyl group, each $R_2$ is a substituent group including alkyl, phenyl or fluoroalkyl group, preferably a methyl, n-decyl, phenyl or heptadecafluoro-1,1,2,2-tetrahydrodecyl group, more preferably heptadecafluoro-1,1,2,2-tetrahydrodecyl.

Further embodiment of the present invention, the fluorinated siloxane resin is crosslinked with a silane compound including an amino group, as depicted in Reaction Scheme 4:

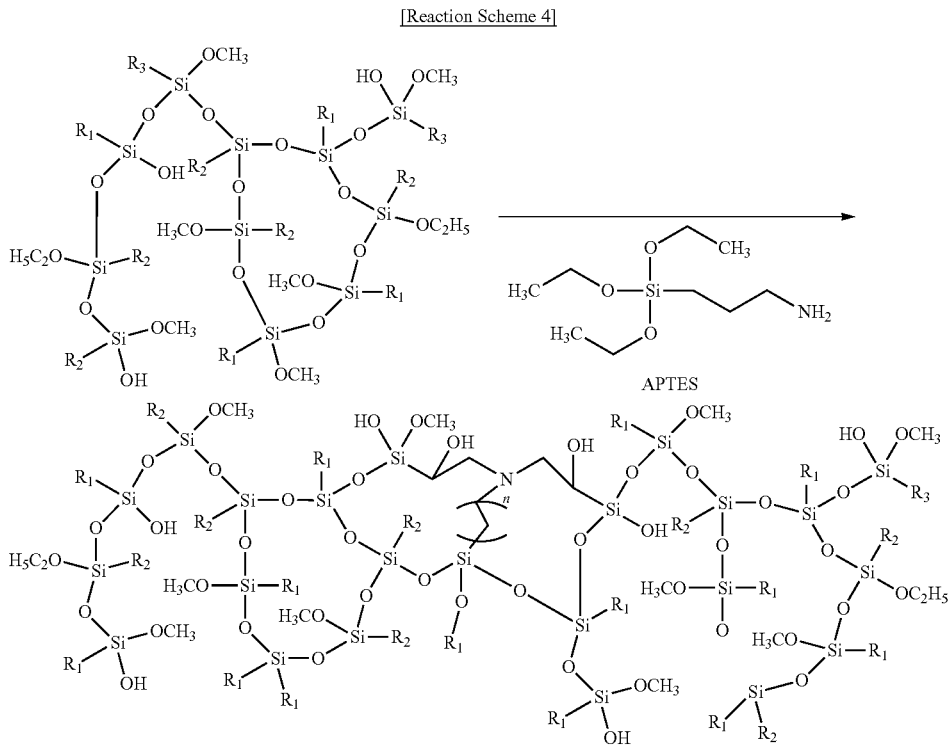

wherein each $R_1$, $R_2$ is the same as described above.

According to one embodiment of the present invention, the crosslinked modified siloxane resin as a hydrophobic binder may be mixed with silica particles, followed by spray coating.

FIG. 1 shows a procedure for spray coating on a substrate in accordance with one exemplary embodiment of the present invention. The procedure is described in detail with reference to FIG. 1.

First, silica nanoparticles (SNPs) and the hydrophobic binder are dissolved in a solvent to prepare a coating solution. Next, the degree of dispersion of the particles in the solution can be controlled by sonication. Subsequently, the coating solution is applied onto a substrate. After removal of the solvent by evaporation, the silica nanoparticles (SNPs) form aggregates with the hydrophobic binder. Finally, the aggregates applied onto the substrate can be annealed to fabricate a superhydrophobic surface having hierarchical structures.

The morphology of the coating surface can be controlled by varying the aggregation state of the silica particles in the mixed solution, the content of the silica particles, and the content of the hydrophobic binder.

The content of the silica particles is preferably from 1.0 to 1.5 wt %, based on the weight of the mixed solution. If the content of the silica particles is less than 1.0 wt %, the effect of the silica particles is insignificant. Meanwhile, if the content of the silica particles exceeds 1.5 wt %, the hydrophilic silica particles protrude out of the hydrophobic binder, and as a result, the superhydrophobicity of the coating deteriorates, causing poor durability.

The content of the hydrophobic binder is preferably from 3.0 to 8.0 wt %, more preferably 4.0 to 6.0 wt %, based on the weight of the mixed solution. If the content of the hydrophobic binder is less than 3.0 wt %, the effect of the hydrophobic binder is insignificant. Meanwhile, if the content of the hydrophobic binder exceeds 8.0 wt %, the hydrophobic binder covers the silica particles, and as a result, the surface roughness of the coating is reduced, causing low superhydrophobicity.

The aggregation state of the particles can be controlled by varying sonication time. The sonication serves to break the aggregates of the particles in the solution into smaller sizes. For example, when sonication is carried out for 1 minute, 5 minutes, 10 minutes, 30 minutes, and 1 hour, the aggregates can be broken into smaller particles having sizes of 8-10 μm, 3-5 μm, 3-4 μm, 1.7-2 μm, and 1.5-1.7 μm, respectively.

The shorter the sonication time, the larger the surface roughness of the silica particles. Meanwhile, the longer the sonication time, the smaller the size of the aggregates of the particles in the solution, making the surface smoother. The smooth surface leads to a reduction in surface roughness and the formation of small air pockets between water droplet and the surface, causing poor water repellency properties.

The sonication time is preferably from 1 to 10 minutes. If the sonication time is shorter than 1 minute, the aggregates of the silica particles clog a nozzle of a spray coater, making is difficult to coat the solution. Meanwhile, if the sonication time is longer than minutes, the surface roughness is excessively reduced, causing poor superhydrophobicity.

In the Examples section that follows, spray coating with a dispersion of the silica particles and the hydrophobic binder in ethanol over a large area was compared with coating with the hydrophobic binder alone (i.e. without the silica particles). As a result, a surface fabricated by coating with the hydrophobic binder alone had a contact angle of about 95° whereas a superhydrophobic surface fabricated by spray coating with the hydrophobic binder and the silica particles had a contact angle of about 160°, indicating that the hydrophobic binder surrounds the silica particles having high surface energy during spray coating. The silica particles create surface hierarchical structures and the hydrophobic binder has low surface energy.

The superhydrophobic surface fabricated in accordance with the present invention can stably maintain its superhydrophobicity even at a high temperature (300° C.) and exhibits superhydrophobicity even after storage in various solvents such as acetone, ethanol, isopropyl alcohol, tetrahydrofuran, and toluene for a long time (200 hours or more). The superhydrophobic surface has a pencil hardness of H to 2H, indicating its high durability.

The present invention will be explained in more detail with reference to the following examples and the accompanying drawings.

It will be obvious to those skilled in the art that these examples are provided for illustrative purposes only and are not intended to limit the scope of the present invention in accordance with the gist of the present invention.

EXAMPLES

Example 1

(3-Glycidyloxypropyl)trimethoxysilane (GOTMS, Sigma-Aldrich) was mixed with (heptadecafluoro-1,1,2,2-tetrahydrodecyl)triethoxysilane (FAS, Gelest). The FAS was used in an amount of 2 mol % with respect to the GOTMS. The mixture was placed in a 20 ml vial. Thereafter, water ($H_2O$) was added to the vial. The water was used in an amount of 0.5 mole per 1 mole of the alkoxy groups of the silanes. 0.01 mL of ammonia as a catalyst was added to the mixture and stirred at room temperature for 24 h to obtain a fluorinated siloxane resin. The modified siloxane resin had a weight average molecular weight of 2,952 and a PDI (Mw/Mn) of 1.35, as determined by gel permeation chromatography.

Example 2

The procedure of Example 1 was repeated except that the (heptadecafluoro-1,1,2,2-tetrahydrodecyl)triethoxysilane (FAS) was used in an amount of 1.0 mol %.

Example 3

The procedure of Example 1 was repeated except that the (heptadecafluoro-1,1,2,2-tetrahydrodecyl)triethoxysilane (FAS) was used in an amount of 1.3 mol %.

Example 4

The procedure of Example 1 was repeated except that the (heptadecafluoro-1,1,2,2-tetrahydrodecyl)triethoxysilane (FAS) was used in an amount of 4.0 mol %.

Example 5

The procedure of Example 1 was repeated except that the (heptadecafluoro-1,1,2,2-tetrahydrodecyl)triethoxysilane (FAS) was used in an amount of 6.0 mol %.

Example 6

The procedure of Example 1 was repeated except that the (heptadecafluoro-1,1,2,2-tetrahydrodecyl)triethoxysilane (FAS) was used in an amount of 10.0 mol %.

Example 7

The procedure of Example 1 was repeated except that (heptadecafluoro-1,1,2,2-tetrahydrodecyl)trichlorosilane (FCS) was used in an amount of 1.0 mol % instead of the (heptadecafluoro-1,1,2,2-tetrahydodecyl)triethoxysilane (FAS).

Example 8

The procedure of Example 1 was repeated except that (heptadecafluoro-1,1,2,2-tetrahydrodecyl)trichlorosilane (FCS) was used in an amount of 2.0 mol % instead of the (heptadecafluoro-1,1,2,2-tetrahydodecyl)triethoxysilane (FAS).

Example 9

The procedure of Example 1 was repeated except that n-decyltriethoxysilane (DTES) was used in an amount of 2.0 mol % instead of the (heptadecafluoro-1,1,2,2-tetrahydrodecyl)trichlorosilane (FCS).

Example 10

The procedure of Example 1 was repeated except that n-decyltriethoxysilane (DTES) was used in an amount of 10.0 mol % instead of the (heptadecafluoro-1,1,2,2-tetrahydrodecyl)trichlorosilane (FCS).

Example 11

The procedure of Example 1 was repeated except that n-decyltriethoxysilane (DTES) was used in an amount of 15.0 mol % instead of the (heptadecafluoro-1,1,2,2-tetrahydrodecyl)trichlorosilane (FCS).

Example 12

The procedure of Example 1 was repeated except that n-decyltriethoxysilane (DTES) was used in an amount of 20.0 mol % instead of the (heptadecafluoro-1,1,2,2-tetrahydrodecyl)trichlorosilane (FCS).

Example 13

The procedure of Example 1 was repeated except that dimethoxydimethylsilane (DMDMS) was used in an amount of 2.0 mol % instead of the (heptadecafluoro-1,1,2,2-tetrahydrodecyl)trichlorosilane (FCS).

Example 14

The procedure of Example 1 was repeated except that dimethoxydimethylsilane (DMDMS) was used in an amount of 8.0 mol % instead of the (heptadecafluoro-1,1,2,2-tetrahydrodecyl)trichlorosilane (FCS).

Example 15

The procedure of Example 1 was repeated except that dimethoxydimethylsilane (DMDMS) was used in an amount of 20.0 mol % instead of the (heptadecafluoro-1,1,2,2-tetrahydrodecyl)trichlorosilane (FCS).

Example 16

The procedure of Example 1 was repeated except that dimethoxydiphenylsilane (DMDPS) was used in an amount of 2.0 mol % instead of the (heptadecafluoro-1,1,2,2-tetrahydrodecyl)trichlorosilane (FCS).

Example 17

The procedure of Example 1 was repeated except that dimethoxydiphenylsilane (DMDPS) was used in an amount of 8.0 mol % instead of the (heptadecafluoro-1,1,2,2-tetrahydrodecyl)trichlorosilane (FCS).

Evaluation and Results

XPS Experiment

The siloxane resin synthesized in Example 1 was spin-coated on a glass substrate. FIG. 2 shows an XPS spectrum of the spin-coated resin. Referring to FIG. 2, the XPS analysis reveals that a fluorine peak appeared only in the sample including FAS.

Surface Energy Experiment

The surface energies of the siloxane resins synthesized in Examples 1-6 were measured and are shown in FIG. 3. The FAS was added in different amounts for surface energy control. Referring to FIG. 3, the surface energy of the resin tended to decrease with increasing FAS content and saturated to about 19 mJ/m$^2$ from FAS 2 mol %. Fluorinated compounds have low degrees of dispersion in common organic solvents and are relatively expensive. Therefore, FAS 2 mol %, at which the surface energy was saturated, was decided as an optimal amount. The weight average molecular weight and polydispersity index of the siloxane resin prepared in Example 1 were 2952 g/mol and 1.35, respectively, as analyzed by GPC.

Preparation of Compositions Including Siloxane Resin Binder

3-Aminopropyltriethoxysilane (APTES) as a dually curable reactive monomer was added to the modified siloxane resin synthesized in Example 1 to prepare a siloxane hard coating resin composition. The APTES was used in an amount of 0.5 mol % with respect to the (3-glycidyloxypropyl)trimethoxysilane (GOTMS). The composition was spin coated on a glass surface and annealed at a temperature 150° C. for 2 h to obtain a siloxane hard coating solution.

Spray Coating Process

FIG. 1 shows a procedure for spray coating on a substrate in accordance with one exemplary embodiment of the present invention. Silica nanoparticles and the hydrophobic binder were used to prepare a coating solution, followed by sonication to control the degree of dispersion of the particles in the solution. Thereafter, the solution was sprayed on a substrate to fabricate a superhydrophobic surface having hierarchical structures. The particles act to create the surface hierarchical structures and the binder has low surface energy.

When the coating solution was sprayed on the substrate, the solvent (ethanol) was rapidly removed by evaporation and the particles aggregated, facilitating the formation of the hierarchical structures. Next, annealing was performed. As a result, the remaining solvent was completely removed by evaporation and the siloxane resin was cured by reaction with APTES.

3-Aminopropyltriethoxysilane (APTES) was used as a curing agent for the resins of Examples 1-6 and 3-aminopropyltrimethoxysilane (APTMS) was used as a curing agent for the resins of Examples 7-17.

CA values representing the surface energies of the resins of Examples 1-17 are shown in Table 1.

TABLE 1

| Example No. | CA (degree) |
| --- | --- |
| Example 1 | 78 |
| Example 2 | 81 |
| Example 3 | 104 |
| Example 4 | 104 |
| Example 5 | 104 |
| Example 6 | 104 |
| Example 7 | 101 |
| Example 8 | 104 |
| Example 9 | 57 |
| Example 10 | 69 |
| Example 11 | 54 |
| Example 12 | 61 |
| Example 13 | 54 |
| Example 14 | 62 |
| Example 15 | 62 |
| Example 16 | 59 |
| Example 17 | 53 |

As can be seen from the results in Table 1, the resins of Examples 1-17 showed excellent water repellency properties.

Water Repellency Properties as a Function of Sonication Time

FIG. 4 shows the wet properties of the siloxane resin according to one exemplary embodiment of the present invention as a function of sonication time. Referring to FIG. 4, the water repellency properties deteriorated with increasing sonication time and the coating lost its superhydrophobicity when the sonication time was longer than 10 min. The siloxane resin was measured to have pencil hardness values of B-HB and H-2H when sonicated for 1 min and 5 min, respectively. Therefore, 5 min sonication was decided as an optimal condition. This is because 5 min sonication led to higher surface hardness than 1 min sonication.

When the sonication time was longer than 10 min, SA was impossible to measure because the surface roughness dropped. Accordingly, water droplets do not roll off easily due to their strong adherence to the coating surface. This is because sonication serves to break the aggregates of the particles in the solution into smaller sizes.

FIG. 5 shows the sizes of the aggregates in the resin according to one exemplary embodiment of the present invention as a function of sonication time and FIG. 6 shows the surface roughnesses of the resins according to exemplary embodiments of the present invention when sonicated for different times. Referring to FIGS. 5 and 6, as the sonication time increased, the particle size decreased, making the surface of the coating relatively smooth. When the surface roughness decreased, small air pockets are formed between the water droplet and the surface, resulting in poor water repellency properties (1 min: 9.6 μm, 5 min: 4.4 μm, 10 min: 3.6 μm, 30 min: 1.9 μm, 60 min: 1.7 μm, 90 min: 1.6 μm).

Water Repellency Properties as a Function of Particle Concentration

FIGS. 7 and 8 show the water repellency of the resins according to exemplary embodiments of the present invention with varying concentrations of the particles in the solutions. The water repellency properties were improved with increasing content of the particles and tended to deteriorate from 1 wt %, as shown in FIG. 7, because the surface roughness increased with increasing content of the nanoparticles and the hydrophilic silica particles were slightly exposed from the binder at concentrations above a predetermined level (0.5 wt %: 2.6 μm, 0.7 wt %: 3.2 μm, 1.0 wt %: 4.4 μm, 1.5 wt %: 8.6 μm, 2.0 wt %: 13.6 μm, 4.0 wt %: 33.4 μm), as shown in FIG. 8.

Water Repellency Properties as a Function of Binder Content

FIG. 9 shows the water repellency properties of the resins according to exemplary embodiments of the present invention with varying binder contents. Referring to FIG. 9, the water repellency properties were improved with increasing hydrophobic binder content and deteriorated from when the binder content was 5 wt %, which seems to be because the binder covered the particles, resulting in low surface roughness.

Hardness of Superhydrophobic Surface

FIG. 10 shows a method for measuring the water repellency properties of the coating formed in accordance with one exemplary embodiment of the present invention and FIG. 11 shows the hardness values of the superhydrophobic surface fabricated by the application of the siloxane resin according to one exemplary embodiment of the present invention. Referring to FIGS. 10 and 11, the hardness values of the fabricated superhydrophobic surface were measured by a sand impacting test. After the coating surface was inclined at 45°, 10 g of sand per minute was dropped from a height of about 30 cm onto the surface and a change in hardness was measured over time (76*52 mm).

Referring to FIG. 11, the water repellency properties deteriorated slightly with time but were maintained even after 30 min.

Thermal Properties and Chemical Resistance

FIG. 12 shows the thermal stability of the water repellent coating solution prepared in accordance with one exemplary embodiment of the present invention after coating and FIG. 13 shows the chemical resistance of the water repellent coating solutions prepared in accordance with exemplary embodiments of the present invention to organic solvents. After the sample was placed in an oven for 1 hour and taken out of the oven, a change in water repellency was observed to measure the thermal stability. Referring to FIGS. 12 and 13, the water repellency of the sample was maintained up to about 300° C. In addition, the superhydrophobicity of the sample was maintained almost constant even after immersion in various solvents, because the siloxane bonds ensured excellent heat and chemical resistance.

Water Repellency Properties on Various Surfaces

FIG. 14 shows photographs of the water repellent materials according to exemplary embodiments of the present invention after coating on various substrates. Referring to FIG. 14, superhydrophobicity of the water repellent materials coated on various substrate surfaces such as glass, metal, and fabric surfaces was successfully achieved. Uncoated regions of these substrates were hydrophilic or completely wet with water, whereas water droplets on the spray-coated regions were substantially spherical regardless of the substrate type.

Although the present invention has been described herein with reference to the preferred embodiments, it will be understood by those skilled in the art that the invention can be implemented in other specific forms without changing the essential features of the present invention. Therefore, the disclosed embodiments should be considered in an illustrative sense rather than in a restrictive sense. The scope of the invention is indicated by the appended claims rather than by the foregoing detailed description, and all differences within the scope of equivalents thereto should be construed as being within the scope of the invention.

The invention claimed is:

1. A crosslinked modified siloxane resin derived from a reaction of a resin represented by Formula 1 with a trialkoxysilane represented by Formula 2:

$$[R_1Si(OCH_3)_x(OH)_yO_z]_m[R_2Si(R_3)_{x'}(OH)_{y'}O_{z'}]_n \quad \text{[Formula 1]}$$

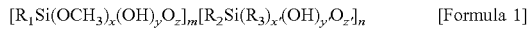

wherein each $R_1$ is a substituent including an epoxy group, each $R_2$ is a substituent including a alkyl, phenyl or fluoroalkyl group, each $R_3$ is a alkoxy or substituent containing chlorine, each x, y, x', y' is an integer of 0 or 1, z is 3-x-y/2, z' is 3-x'-y'/2, and each m, n is an integer from 1 to 100;

$$H_2N(CH_2)_3Si(OR_4)_3 \quad \text{Formula 2}$$

wherein each $R_4$ is a substituent group including methyl, alkyl, phenyl or fluoroalkyl group; wherein the epoxy groups of the resin represented by Formula 1 react with the amine moieties of the trialkoxysilane represented by Formula 2.

2. The crosslinked modified siloxane resin according to claim 1, wherein, in Formula 1, n is 0 or 1, each $R_1$ is a 3-glycidyloxypropyl group, and each $R_2$ is a methyl, n-decyl, phenyl or heptadecafluoro-1,1,2,2-tetrahydrodecyl group.

3. The crosslinked modified siloxane resin according to claim 1, wherein, in Formula 1, n is 0, each $R_1$ is a 3-glycidyloxypropyl group, each $R_2$ is a heptadecafluoro-1,1,2,2-tetrahydrodecyl, and each $R_3$ is an ethoxy group.

4. A method for preparing the crosslinked modified siloxane resin of claim 1, comprising (a) mixing and reacting a (3-glycidyloxypropyl)trimethoxysilane with a compound comprising one or more alkoxysilane groups to prepare the resin represented by Formula 1 of claim 1, (b) adding a trialkoxysilane represented by Formula 2 of claim 1 to the resin represented by Formula 1 of claim 1, to prepare the crosslinked modified siloxane resin of claim 1, wherein the trialkoxysilane represented by Formula 2 is added in an amount of 0.1 to 10 mol % with respect to the (3-glycidyloxypropyl)trimethoxysilane.

5. The method according to claim 4, wherein the compound comprising one or more alkoxysilane groups is selected from the group consisting of (heptadecafluoro-1,1,2,2-tetrahydrodecyl)triethoxysilane (FAS), (heptadecafluoro-1,1,2,2-tetrahydrodecyl)trichlorosilane (FCS), n-decyltriethoxysilane (DTES), dimethoxydimethylsilane (DMDMS), and dimethoxydiphenylsilane (DMDPS).

6. The method according to claim 4, wherein the trialkoxysilane represented by Formula 2 is 3-aminopropyltrimethoxysilane (APTMS) or 3-aminopropyltriethoxysilane (APTES).

* * * * *